United States Patent
Liu et al.

(10) Patent No.: US 10,798,240 B1
(45) Date of Patent: *Oct. 6, 2020

(54) IDENTIFYING AND PROCESSING OF UNRETURNED CALLS IN IPBX

(71) Applicant: 8x8, Inc., San Jose, CA (US)

(72) Inventors: Zhishen Liu, San Jose, CA (US); Qing Zhao, San Jose, CA (US); Bryan R. Martin, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/105,327

(22) Filed: Aug. 20, 2018

Related U.S. Application Data

(63) Continuation of application No. 15/431,291, filed on Feb. 13, 2017, now Pat. No. 10,057,416, which is a (Continued)

(51) Int. Cl.
*H04M 3/42* (2006.01)
*H04M 15/34* (2006.01)
(Continued)

(52) U.S. Cl.
CPC ..... *H04M 3/42195* (2013.01); *H04M 3/2218* (2013.01); *H04M 3/42314* (2013.01); *H04M 7/006* (2013.01); *H04M 7/009* (2013.01); *H04M 7/0066* (2013.01); *H04M 15/34* (2013.01); *H04M 15/56* (2013.01); *H04Q 3/10* (2013.01);
(Continued)

(58) Field of Classification Search
None
See application file for complete search history.

(56) References Cited

U.S. PATENT DOCUMENTS 6,289,084 B1 * 9/2001 Bushnell ................ H04M 1/57
                                                            379/67.1
6,782,080 B2    8/2004 Leivo et al.
                       (Continued)

FOREIGN PATENT DOCUMENTS

WO    2008089522 A1    7/2008

OTHER PUBLICATIONS

Gerry Blackwell, "Jajah: Free VoIP with a Twist," www.voipplanet.com (Oct. 5, 2006).
(Continued)

*Primary Examiner* — Rebecca E Song
(74) *Attorney, Agent, or Firm* — Crawford Maunu PLLC

(57) ABSTRACT

Apparatuses and methods concerning routing of calls in an IPBX server are disclosed. A first processing circuit is communicatively coupled to an IPBX server that routes VoIP calls for a plurality of end-users having respective VoIP-enabled devices and generates call event messages for the routed calls. The first processing circuit generates call summary metrics from the call event messages. A second processing circuit evaluates the call summary metrics to identify a set of incoming calls to the IPBX that were missed and have not been returned by the end-users. The second processing circuit cross-correlates the identified set of incoming calls with a secondary data source to determine a respective priorities for the set of incoming calls. The second processing circuit stores data indicating calls of the identified set have a higher priority.

19 Claims, 5 Drawing Sheets

Related U.S. Application Data continuation of application No. 15/239,600, filed on Aug. 17, 2016, now Pat. No. 9,578,166, which is a continuation of application No. 14/828,214, filed on Aug. 17, 2015, now Pat. No. 9,432,519.

(51) Int. Cl.
   *H04M 3/22* (2006.01)
   *H04M 7/00* (2006.01)
   *H04M 15/00* (2006.01)
   *H04Q 3/10* (2006.01)

(52) U.S. Cl.
   CPC ........ *H04M 7/0045* (2013.01); *H04M 7/0048* (2013.01); *H04M 7/0054* (2013.01); *H04M 2203/551* (2013.01); *H04M 2250/60* (2013.01)

(56) References Cited

U.S. PATENT DOCUMENTS

| | | | |
|---|---|---|---|
| 7,647,041 B2 | 1/2010 | Gonsalves et al. | |
| 8,300,634 B2 | 10/2012 | Narayanaswamy | |
| 8,620,278 B1* | 12/2013 | Oroskar | H04M 11/10 379/67.1 |
| 9,432,519 B1 | 8/2016 | Liu et al. | |
| 9,578,166 B1 | 2/2017 | Liu et al. | |
| 2004/0171394 A1 | 9/2004 | Daita | |
| 2004/0233892 A1* | 11/2004 | Roberts | H04Q 3/0029 370/352 |
| 2007/0201661 A1 | 8/2007 | Fullarton et al. | |
| 2008/0118041 A1 | 5/2008 | Finogenov | |
| 2009/0221265 A1 | 9/2009 | Liu et al. | |
| 2010/0197288 A1 | 8/2010 | Camilleri et al. | |
| 2010/0268797 A1 | 10/2010 | Pyrik et al. | |
| 2011/0202440 A1 | 8/2011 | Jarrah | |
| 2012/0114110 A1 | 5/2012 | Schlossman et al. | |
| 2015/0189100 A1* | 7/2015 | Wang | H04M 19/041 455/414.1 |
| 2016/0191694 A1* | 6/2016 | Kim | H04M 1/274508 455/418 |

OTHER PUBLICATIONS

Jeff Goldman, "TalkPlus: a PBX for Mobil Phones," www.voipplanet.com (Aug. 16, 2007).

* cited by examiner

US 10,798,240 B1

IDENTIFYING AND PROCESSING OF UNRETURNED CALLS IN IPBX

OVERVIEW

A private branch exchange (PBX) routes calls between a service provider network (e.g., a cellular network or a public standard telephone network (PSTN) and a plurality of end-users having respective telephone extensions in a private telecommunication network. One type of PBX, known as an Internet Protocol PBX (IPBX), routes calls between a service provider network and a plurality of Voice over Internet Protocol (VoIP)-enabled devices on an IP network using VoIP, in which each device is assigned a respective telephone extension.

SUMMARY

Apparatuses and methods concerning routing of calls in an IPBX server are disclosed. As an example, one apparatus includes a first processing circuit communicatively coupled to an IPBX server. The IPBX is configured to route VoIP calls for a plurality of end-users having respective VoIP-enabled devices communicatively coupled to the IPBX server via a communications network. The IPBX generates call event messages indicating changes in statuses of the routed VoIP calls. The first processing circuit is configured to generate call summary metrics from the call event messages. The call summary metrics indicate respective sets of call data for participants of the calls routed by the IPBX server. A second processing circuit is configured to evaluate the call summary metrics to identify a set of incoming calls to the IPBX that were missed and have not been returned by the end-users. The second processing circuit is further configured to cross-correlate the identified set of incoming calls with a secondary data source to determine respective priorities for the set of incoming calls. The respective priorities include a higher priority for at least one call and a lower priority for at least one call. The second processing circuit stores data indicating calls of the identified set determined to have the higher priority.

A method is also disclosed for analyzing call data. Using an IPBX server, VoIP calls are routed for a plurality of end-users having respective VoIP-enabled devices communicatively coupled to the IPBX server via a communications network. Call event messages, which indicate changes in statuses of the routed VoIP calls, are provided to a call data processing circuit communicatively coupled to the IPBX server. Using a first processing circuit, call summary metrics are generated for the calls routed by the IPBX server based on the call event messages. The call summary metrics indicate respective sets of call data for participants of the calls routed by the IPBX server. Using a second processing circuit the call summary metrics are evaluated to identify a set of incoming calls to the IPBX that were missed and have not been returned by the end-users. The identified set of incoming calls is cross-correlated with a secondary data source to determine respective priorities for the set of incoming calls. The respective priorities include a higher priority for at least one call and a lower priority for at least one call. The second processing circuit stores a set of data indicating calls of the identified set determined to have the higher priority.

BRIEF DESCRIPTION OF THE FIGURES

The disclosure may be more completely understood in consideration of the following detailed description of various embodiments of the disclosure, in connection with the accompanying drawings in which.

Figure 1:
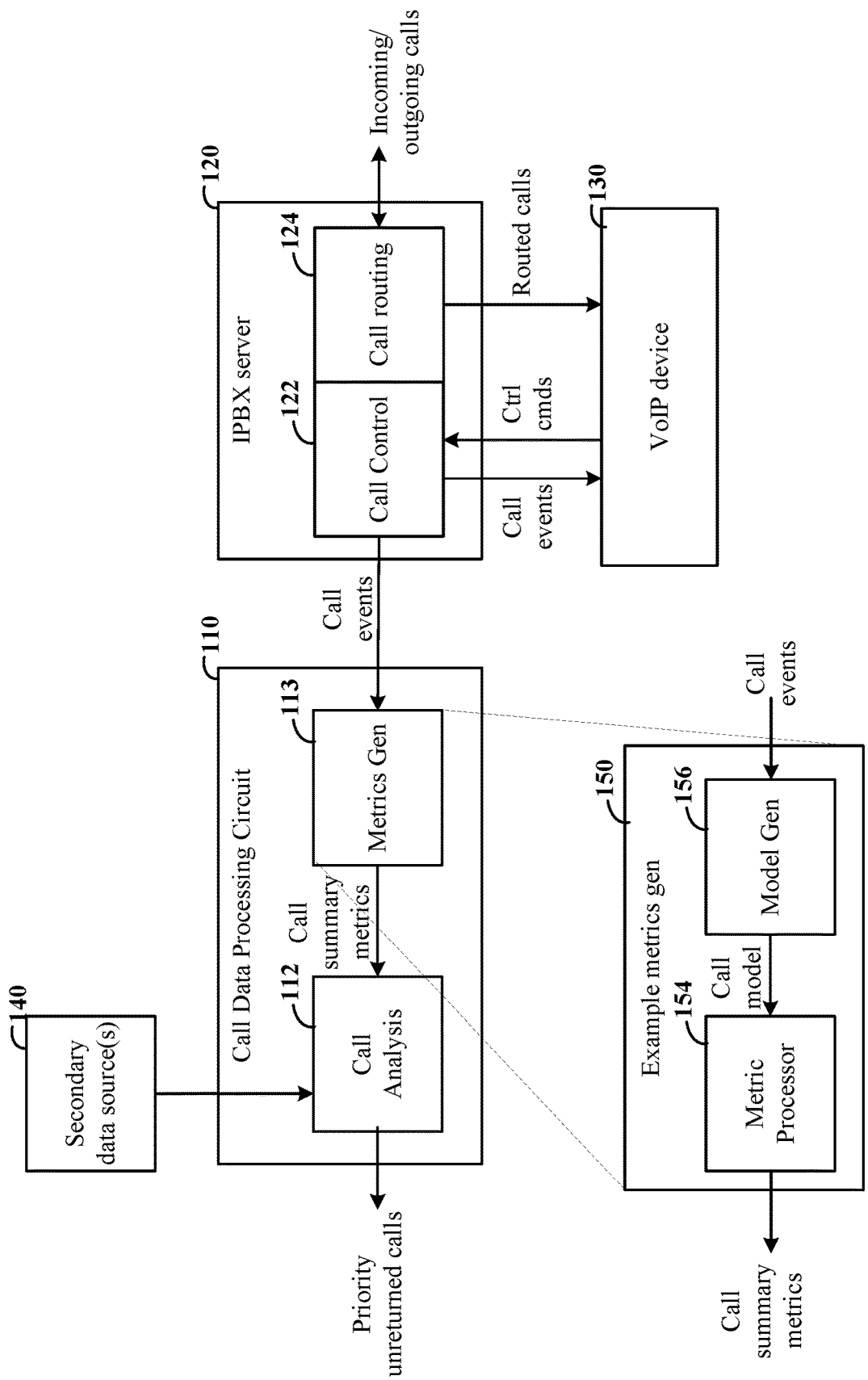
FIG. 1 shows an example communication system having an IPBX server and a call data processing circuit configured in accordance with one or more embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods utilizing an IPBX server to route calls for end-users in a communication network.

In some implementations, the IPBX server generates call event messages to indicate changes in statuses of calls in the IPBX. Call event messages may include, for example, ring/alert, call connected, call disconnected, call on-hold, call parked, call reconnected, call transferred, and/or calls merged/conferenced. The call event messages may be provided to various end-users and/or applications in addition to end-users who are participants in a call. For example, the call event messages may by be used by an application to track and assess processing of incoming calls by a plurality of end-users in the IPBX. Incoming calls may be tracked for all end-users connected in an IPBX or only for a subset of end-users (e.g., in a particular department or call canter of interest). While the disclosed embodiments are not necessarily limited to such applications, various aspects of the present disclosure may be appreciated through a discussion of various examples using this context.

In one or more embodiments, an apparatus includes a first processing circuit configured to generate call summary metrics for calls routed by an IPBX based on the call event messages received from the IPBX. The call summary metrics indicate respective sets of call data for participants of the calls routed by the IPBX server. For example, the call summary metrics may indicate for each of the call participants: a number of incoming calls, a number of outgoing calls, a number of answered calls, a number of missed calls, a number of abandoned calls, average call time, average time to answer, average on-hold time, or various combinations thereof. In some embodiments, the first processing circuit may also generate data metrics characterizing other data parameters (e.g., address events for devices, statuses/presence of end-users, and/or use of network application) that are monitored in an IPBX network or received from secondary data sources. Secondary data sources may include, for example, applications utilized by the end-users in the IPBX, internet-connected data repositories, and/or third-party data subscription services.

The apparatus also includes a second processing circuit that is configured to evaluate the call summary metrics to identify a set of incoming calls to the IPBX that were missed and have not been returned by the end-users. Missed calls include incoming calls that were routed to voicemail or abandoned by the caller before being answered by an end-user in the IPBX. In various implementations, responsiveness to missed calls may be determined on a company-wide level or for individual extensions. For instance, in some implementations, a call from one extension of a company may be considered to be returned by an agent only if the agent places a call to the same extension. In some other implementations, a call from an extension of a company may be considered to be returned by an agent if the agent places a call to any extension of the company.

The second processing circuit is further configured to cross-correlate the identified set of incoming calls with a secondary data source to determine respective priorities for the incoming calls. Secondary data sources may include, for example, an IPBX directory, contract directories of individual end-users in an IPBX, non-voice messaging services (e.g., short message service (SMS), email, or instant messaging), internet-connected data repositories, and/or third-party data subscription services. The respective priorities include a higher priority for at least one call and a lower priority for at least one call. The second processing circuit stores data indicating calls of the identified set determined to have the higher priority.

The second processing circuit may determine priorities of calls using various criteria including, for example, probability that the call is SPAM, number of caller and/or callee, subject matter of the call (e.g., indicated in voice mail, entered in an automated call menu, or specified in schedule meeting data of a callee). In some implementations, the second processing circuit determines a subset of higher priority ones of the unreturned calls by filtering out calls having a high probability of being SPAM. SPAM may be identified, for example, by cross-referencing a number of a caller with a database of telephone number blocks associated with known telemarketing firms. Alternatively or additionally, SPAM may be identified based on recent call behavior of a caller. For instance, frequent placing of short duration calls or calling telephone numbers in a sequential order may indicate a higher probability that the calls are SPAM.

In some implementations, the second processing circuit may prioritize calls based on the caller and/or callee of the calls. For instance, the second processing circuit may identify high priority unreturned calls by cross-referencing the calls with a list of callees for which incoming calls are considered to be higher priority. The list of callers may include, for example, extensions for agents in a sales department or agents in a rapid response group. Additionally or alternatively, the second processing circuit may use a list of callers from which calls are considered to be higher priority. The list of callees may include, for example, numbers for purchasing agents for repeat customers or numbers indicated in a database of sales leads. Additionally or alternatively, the second processing circuit may use a list of callers from which calls are considered to be lower priority. For example, calls from numbers categorized as personal in a contact list of the callee may be identified as lower priority.

In different implementations, lists of callers and/or callees for higher or lower priority calls may be gathered from various sources. In some implementations, numbers for higher and lower priority lists may be specified in individual contact lists of end-users in an IPBX. As an illustrative example, calls from contacts in a personal contact list of an end-user that are unreturned may be identified as lower priority and calls from contacts in a business contact list of the end-user that are unreturned may be identified as higher priority.

In some embodiments, callers and/or callees for higher priority and/or lower priority calls may be specified in a global policy. In some implementations, the global policy may be manually specified by an authorized user. For example, a sales manager or individual sales agents may manually specify numbers for customers, purchasing agents, or prospective clients that should be considered higher priority for returning unanswered or missed calls. Additionally or alternatively, callers and/or callees for higher priority and/or lower priority calls may be automatically generated or supplemented based on call metrics and/or secondary data sources. For example, in some implementations, an automated function may add a number of a caller to the higher priority list if the call results in a purchase order.

For ease of explanation, the examples may be primarily discussed with reference to prioritization of unreturned calls using two levels of priority (e.g., higher priority or lower priority). However, embodiments are not so limited. The examples may be adapted to prioritize unreturned calls using three or more different levels of priority (e.g., low priority, intermediate priority, high priority, and/or urgent).

For ease of explanation, the examples are also primarily described with reference to an IPBX server. However, the embodiments are not so limited. Rather, some disclosed aspects may be applicable to methods, systems, and apparatuses that provide various types of communication channels including for example, voice calls, voicemail, SMS, instant messaging, memos, and/or email.

Turning now to the figures, FIG. 1 shows an example communication system having an IPBX server configured in accordance with one or more embodiments. The IPBX server 120 includes a call routing circuit 124 configured to route VoIP calls for VoIP-enabled devices (e.g., 130) communicatively coupled to the IPBX server 120 via a network. Each of the VoIP enabled devices corresponds to a respective end-user or call receptionist in the IPBX.

The IPBX server 120 includes a call control circuit 122 configured to direct routing of calls by the call routing circuit 124, responsive to the VoIP-enabled devices 130. VoIP-enabled devices 130 communicates call control commands to the call control circuit 122 of the IPBX server 120 to prompt the call routing circuit 124 to perform various call-related actions selected by an end-user or receptionist. The call control circuit 122 provides event messages to the switchboard interface to indicate changes in statuses of the pending calls to VoIP-enabled devices 130 of end-users who are active participants in the call.

As previously indicated, call event messages may be provided to various end-users and/or applications in addition to end-users who are participants in a call. For instance, in some implementations, an authorized user or application may initiate a subscription to monitor call events for specified end-users. In response to receiving a subscription request, the call control circuit 122 initiates a new subscription for the switchboard interface. While the subscription is active, the call control circuit 122 provides event messages to the subscriber to indicate changes in statuses of the calls for the end-users specified in the subscription.

A call data processing circuit 110 is configured to receive the call event messages generated by the IPBX server 120 for calls to or from the end-users. The call data processing circuit 110 includes a metrics generation circuit 113 configured to generate call summary metrics from the call event messages received from the IPBX 120. Circuit 150 shows an example implementation of the metric generator circuit 113. In this example, the circuit 150 includes a model generation circuit 156 configured to generate call models from the call event messages. A call model may include records describing, for example, participants of a call, connections between the participants, and/or events of the call. The example circuit 150 may also include a metric processor circuit 154 configured to generate call summary metrics from the call models. The call summary metrics indicate various statistics characterizing the call and/or end-user participation. These statistics may include, for example, call participants, a number incoming calls, a number of outgoing calls, a number of answered calls, a number of missed calls, a number of abandoned calls, average call time, average time to answer, average on-hold time, or combinations thereof. In some embodiments, the metrics generation circuit 113 may generate additional data metrics characterizing other data parameters (e.g., address events for devices, statuses/presence of end-users, and/or use of network application) that are monitored in an IPBX network.

The metrics generation circuit 113 may utilize various processes to generate call summary metrics and/or other data metrics from received data. In some embodiments, the metrics generation circuit 113 may implement a processing engine (e.g., KAFKA) to consume various types of events (e.g., call events, address events, and/or status events) and generate data metrics. For example, the metrics generation circuit 113 may implement respective KAFKA event stream processes to consume and process different types of events. For further information regarding generation of call models and call summary metrics, reference may be made to U.S. application Ser. No. 14/725,878, entitled "MODELING AND ANALYSIS OF CALLS IN IPBX", which is fully incorporated by reference herein.

The call data processing circuit 110 also includes an analysis circuit 112 configured to evaluate the call summary metrics to identify a set of incoming calls to the IPBX 120 that were missed and have not been returned by the end-users. The analysis circuit 112 is also configured to cross-correlate the identified set of incoming calls with one or more secondary data sources 140 to determine respective priorities for the unreturned incoming calls. Secondary data sources 140 may include, for example, devices connected in the network, applications utilized by the end-users in the network, internet-connected data repositories and devices, and/or third-party data subscription services. As an illustrative example, the analysis circuit 112 may cross-correlate the identified set of incoming calls with data provided by a customer relationship management (CRM) application configured to manage a company's interactions (e.g., service appointments, marketing, and/or sales) with current and/or future customers. In some embodiments, the analysis circuit 112 may generate metadata formatted for use by a CRM application. For example, metadata provided to the CRM application may identify one of more calls as potential sales leads. In some implementations, the metadata may also specify an agent and/or department to be assigned the sales lead by the CRM application. In different embodiments, the analysis circuit 112 may use various processes to identify unanswered calls. In some embodiments, the analysis circuit 112 may identify unanswered calls based on whether call agents have placed a return call to the particular number of the caller within the threshold time period. In some other embodiments, the analysis circuit 112 may identify unanswered calls based on whether call agents have placed a return call to any number associated with an organization of the caller. For instance, the analysis circuit 112 may be configured to identify an organization associated with a caller and determine a block of numbers associated with the identified organization. Unreturned incoming calls may be identified based on whether call agents have placed a call to a number in the determined block within the threshold time period following the unanswered call.

In some embodiments, responsiveness of call agents to unanswered calls may be determined based on non-voice communications of the call agents in addition to, or in lieu of, voice calls of call agents. Non-voice communications may include, for example, email, short message service (SMS), instant messaging (IM), and/or postage letters. For example, if call summary metrics do not indicate that a return call has placed to caller of an unanswered call, the analysis circuit 112 may determine if call agents have responded to the caller using non-voice communications. In some implementations, the analysis circuit 112 may determine non-voice contacts of the caller from a secondary source (e.g., a directory server). The analysis circuit 112 may cross-correlate the determined non-voice contacts with non-voice messaging records of call agents to determine if a response message has been sent to the caller.

In different embodiments, the analysis circuit 112 may determine priorities for unreturned calls using various processes. In some implementations, the analysis circuit 112 identifies lower priority unreturned calls based on a probability that the calls are SPAM. As previously described, SPAM may be identified, for example, by cross-referencing numbers of callers with a database of telephone number blocks associated with known telemarketing firms or analyzing recent call behavior of the callers. Alternatively or additionally, the analysis circuit 112 may prioritize unreturned calls based on caller and/or callee of the calls. For instance, the analysis circuit 112 may identify high/low priority unreturned calls by cross-referencing the calls with lists specifying callers or callees for which calls are considered to be higher/lower priority. As previously described, lists of callers and/or callees for which calls are considered to be higher or lower priority calls may be gathered from various sources including, for example, business or personal contact lists of end-users, scheduling data of end-users, and/or priority lists specified for individual end-users or for global policies of a department or organization.

In some embodiments, the priority of unreturned incoming calls may depend on status of end-users. For instance, an unreturned incoming calls may be identified as low priority if status of the called end-user indicates the end-user will be available to return the call in the near future. Conversely, if the status indicates the end-user is out of the office, the call may be identified as a higher priority call to be returned by another end-user. Status of an end-user may be determined based on activity data such as input commands/requests in network applications (e.g., a virtual office environment). Some examples of activities can include an end-user checking/sending email, using a scheduling application, using a video conferencing application, retrieving files from a file server, and/or using an active virtual desktop session. Status of end-users may provide insight for analyzing unreturned calls statistics of a department or organization. For instance, numbers of missed (unanswered) calls may be indicative of a department in need of additional call center agents or services. However, user status data may indicate that some or all calls were unreturned because the department was closed for the weekend or nationwide holiday. For further information regarding presence detection circuits and methods, reference may be made to U.S. application Ser. No. 14/661,902, entitled "IPBX CONTROL INTERFACE FOR DISTRIBUTED NETWORKS," (now U.S. Pat. No. 9,949,000) which is fully incorporated by reference herein.

In some embodiments, the analysis circuit 112 is configured to identify unanswered calls or determine priority using a machine learning algorithm (e.g., an evolutionary algorithm). The machine learning algorithm may be evaluated and adjusted in a training process to improve performance and/or accuracy of algorithm. Training may include supervised learning, which manually assesses performance or selects modifications, or may include unsupervised learning, which automatically assesses performance of different variations of the algorithm. In some implementations, the analysis circuit 112 may be configured to continue to adjust the algorithm during operation. For example, the analysis circuit 112 may be configured to perform requested analytic operations using a current algorithm and also with one of more variations of the algorithm. Data from the current algorithm may be used as the result of the analytical operation. Data from the variations of the algorithm may be compared to the current algorithm to determine is any improvement is achieved. If a variation of the algorithm outperforms the current algorithm for a threshold number of data sets, the analysis circuit 112 may select the variation to be used as the current algorithm.

In some embodiments, the analysis circuit 112 is configured to perform various analytical processes in lieu of, or in addition to, the identification of unreturned calls and determination of priority. For example, the analysis circuit 112 may be configured to generate alert messages in response to the identified higher priority unreturned call satisfying a set of alert criteria specified in an alert policy for an individual, department, or organization. For example, a manager of a department may configure an alert policy to alert the manager if a high-priority unanswered call remains unanswered for a threshold period of time. Alert messages may include, for example, email, SMS, IM, and/or automated voice call. In some implementations, an alert message to a user may include a mechanism for the user to select one or more actions indicated in the alert policy. For example, an alert message may include an option to return the call, assign another end-user to return the call, or set up a reminder to return the call in the future.

In some embodiments, the analysis circuit 112 may further analyze the identified unreturned calls and priorities to perform various tasks. As one example, the analysis circuit 112 may evaluate performance of call center agents based on the number of calls that are unreturned by each call center agent. A higher number of unreturned calls, in comparison to other call center agents, may indicate lower performance. Conversely, a lower number of calls that are unreturned by a call center agent, in comparison to other call center agents, may indicate higher performance. In some implementations, the analysis circuit 112 may determine a number of unreturned calls for each call center agent and determine an average number of unreturned calls for a department. If the number of unreturned calls for a call center agent exceeds the average by a threshold amount, the analysis circuit 112 may flag the call center agent for further performance review by a manager.

Figure 2:
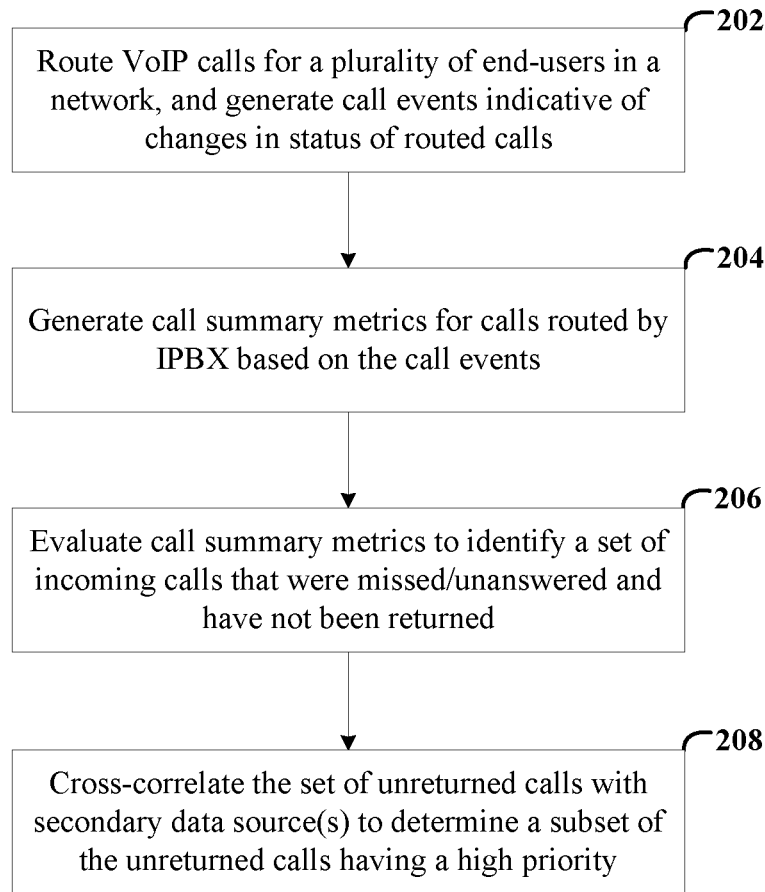
FIG. 2 shows an example process for identifying and processing unreturned calls, consistent with one or more embodiments of the present disclosure.

FIG. 2 shows an example process for identifying and processing unreturned calls, consistent with one or more embodiments of the present disclosure. At block 202, VoIP calls are routed for a plurality of end-users in an IPBX network. Call events indicative of changes in status of routed calls are also generated at block 202. At block 204, call summary metrics are generated for calls routed by IPBX based on the call events. The call summary metrics may be aggregated for calls occurring over various time periods including, for example, second, minutes, hours, days, weeks, months, or years. At block 206, call summary metrics are evaluated to determine a set of incoming calls that were missed and which have not been returned by the end-users. In some implementations, unreturned calls may be identified for all end-users. In some other implementations, unreturned calls may be identified for a particular subset of end-users (e.g., sales agents matching the skillset for the content of the unreturned call). At block 208, the determined set of incoming calls are cross-correlated with one or more secondary data sources to determine a subset of the unreturned calls having a higher priority.

As previously described, higher priority unreturned calls may be identified using various processes and using various criteria including, for example, subject matter of the call, number of the caller, number of the callee, and/or status of the callee. In some implementations, higher priority calls may be identified by filtering out low priority calls (e.g., having a high probability of SPAM or having caller/callee listed in a low priority list). Alternatively or additionally, high priority unreturned calls may be identified by cross-correlating unreturned calls with secondary data sources to identify calls having caller, callee, or subject matter considered to be a higher priority.

Figure 3:
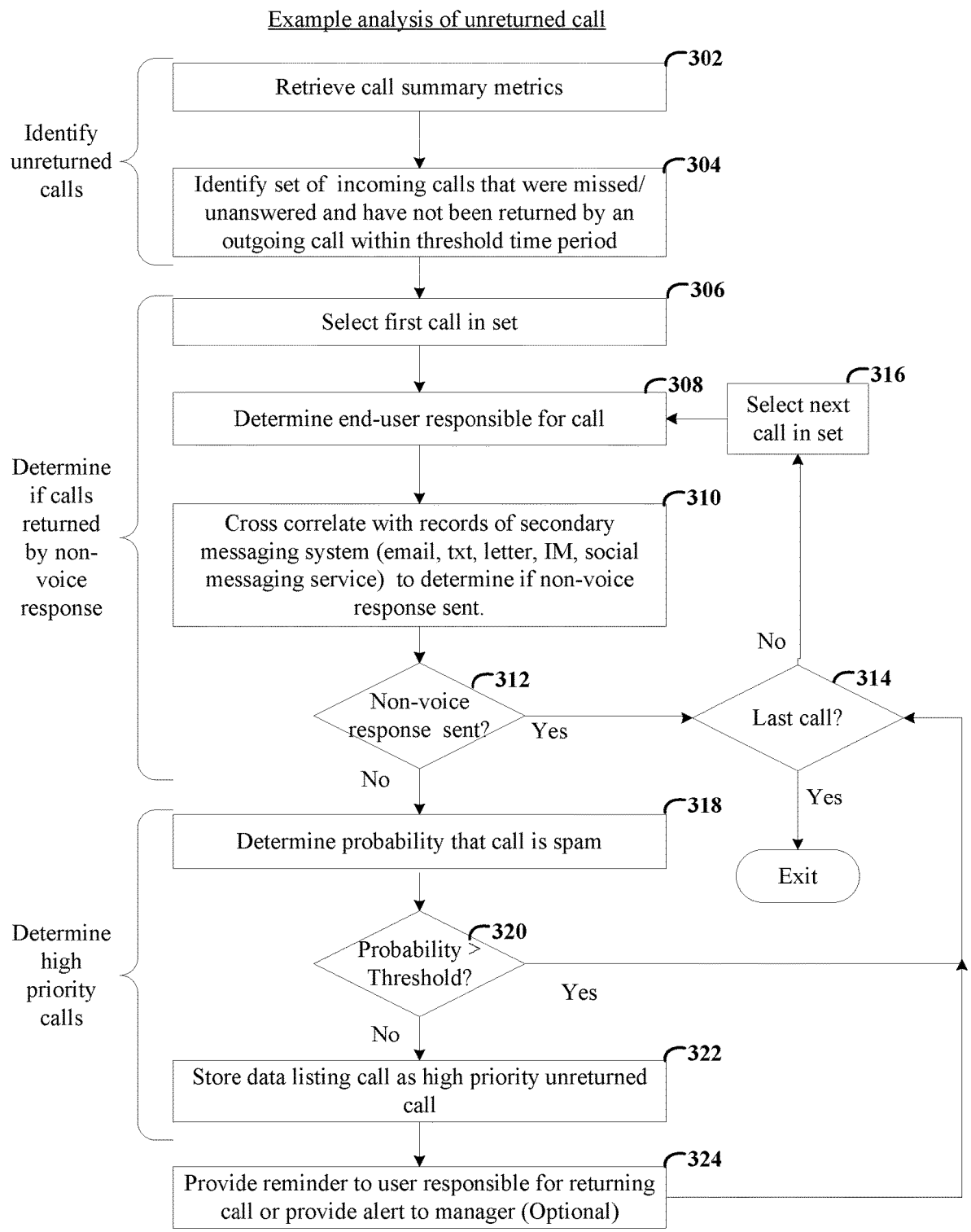
FIG. 3 shows an example process for identifying and processing unreturned calls, consistent with one or more embodiments of the present disclosure.

FIG. 3 shows an example process for identifying and processing unreturned calls, consistent with one or more embodiments of the present disclosure. The process may be performed, for example, by the call analysis circuit 112 in FIG. 1. Unreturned calls are identified at blocks 302 and 304. At block 302, call summary metrics are retrieved for incoming calls in the IPBX. A set of incoming calls that were missed/unanswered and which have not been returned within a threshold period of time are determined at block 304. In this example, the process determines if the identified calls have been returned via non-voice communications at blocks 306 through 314. At block 306, a first call in the set is selected. At block 308, end-user(s) in the IPBX responsible for returning the call is determined. The determined end-user(s) is cross-correlated with records for one or more non-voice communication systems (e.g., email, SMS, IM, and/or postal letter delivery) to determine if a non-voice response was sent by at least one of the determined end-users. If a non-voice response has been sent, the call is considered to be returned and decision block 312 directs the process to decision block 314. If the currently selected call is the last call in the set of incoming calls, decision block 314 directs the process to exit. Otherwise, decision block 314 directs the process to select the next call at block 316. After selecting the next call, the process repeats the process for determining if the call was returned by a non-voice message starting at block 308. If a non-voice response has not been sent, decision block 312 directs the process to block 318.

At blocks 318 through 322, the process determines if the call is a higher priority. As previously described with reference to FIG. 1, higher priority calls may be identified using various processes. In this example, higher priority calls are determined by filtering out calls having a high probability of being SPAM. At block 318, a probability that the call is SPAM is determined. If the determined probability is above a threshold, decision block 320 directs the process to decision block 314. As previously described, if the currently selected call is the last call in the identified set of incoming calls, decision block 314 directs the process to exit. Otherwise, decision block 314 directs the process to select the next call at block 316 and return to block 308. If the determined probability is below the threshold, decision block 320 directs the process to store data listing the call as a high-priority unreturned call at block 322.

As previously described, in some implementations, high-priority unreturned calls may prompt the process to perform various actions. For instance, in some implementations, the process may provide an alert to a user responsible for returning the call or to a supervisor at block 324. If the current call is not the last call in the identified set of the incoming calls, decision block 314 directs the process to select the next call at block 314. After selecting the next call, the process repeats the process for determining if the call was returned by a non-voice message starting at block 308. Decision block 314 directs the process to select the next call at block 316 and returns to block 308. The process loops in this manner until the last one of the set of incoming calls is selected when the process reaches decision block 314.

Figure 4:
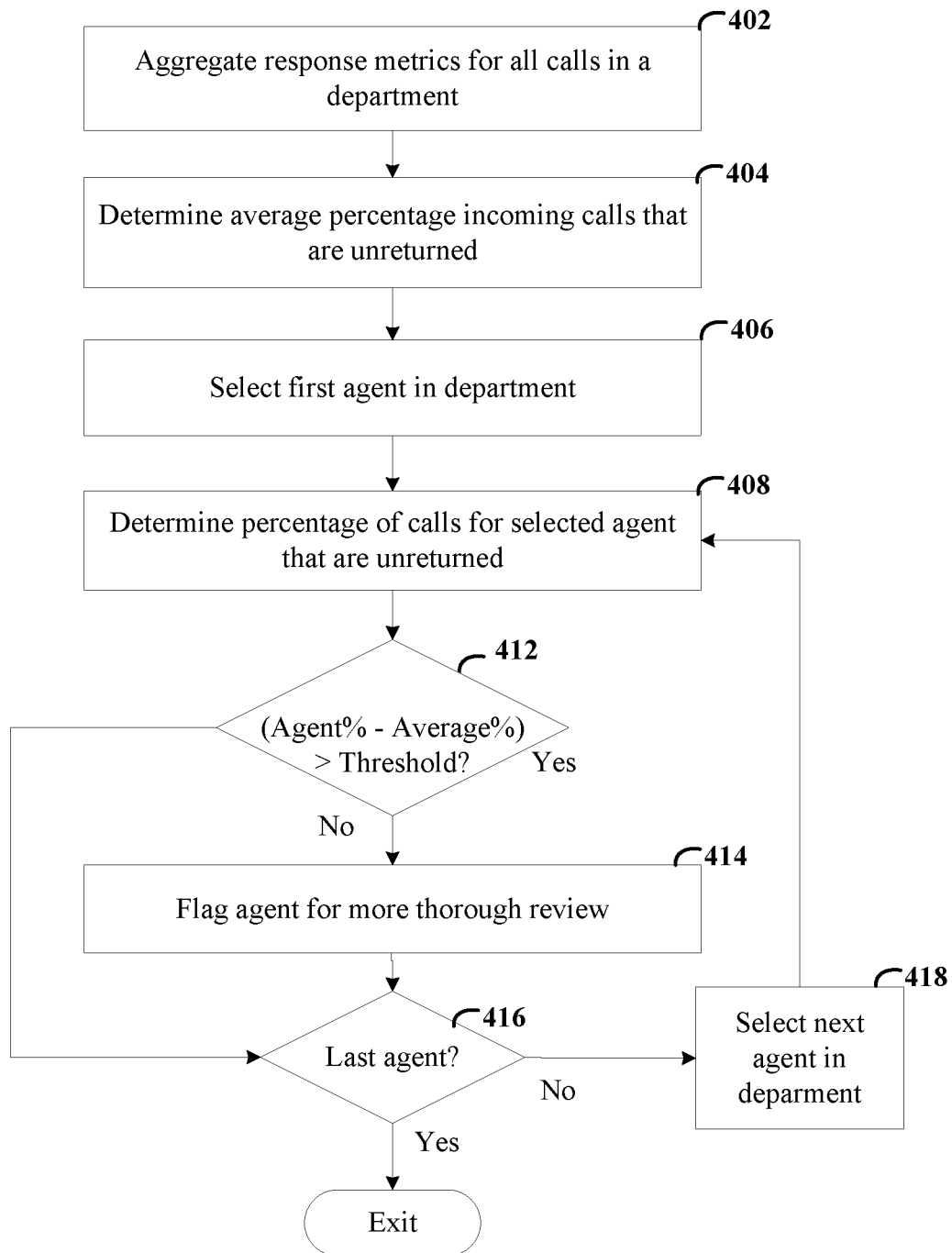
FIG. 4 shows an example process for evaluating call agents, consistent with one or more embodiments of the present disclosure.

FIG. 4 shows an example process for evaluating performance of call agents based on identified unreturned calls, consistent with one or more embodiments of the present disclosure. In this example, the process assesses performance of call agents based on responsiveness to unanswered calls relative to other call agents. At block 402, call metrics indicating responsiveness of call agents to unanswered calls is aggregated for a department. At block 404, an average percentage of unanswered calls that are returned is determined. At block 406, a first agent in the department is detected. At block 408, a percentage of unanswered incoming calls for the selected agent is determined. If the determined percentage for the call agent exceeds the average percentage by an amount greater than a threshold amount, decision block 412 directs the process to flag the agent at block 414 for a more thorough review by a supervisor. Otherwise, decision block 412 directs the process to bypass block 414 and proceed to decision block 416. The process loops in this manner until the last call agent is selected when the process reaches decision block 416.

Figure 5:
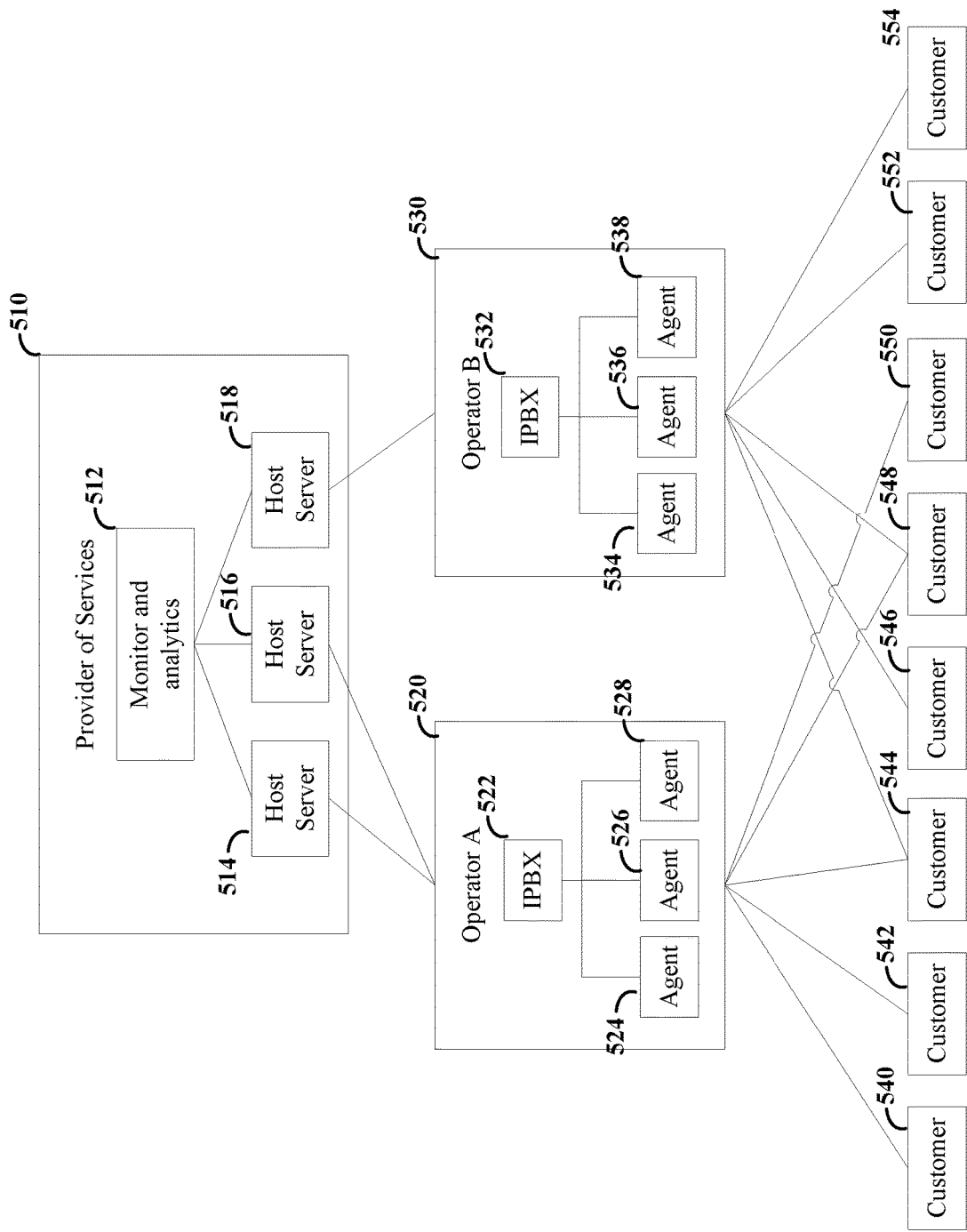
FIG. 5 shows an example hierarchy of a service provider, organizations, and customers, consistent with one or more embodiments of the present disclosure.

FIG. 5 shows an example hierarchy of a service provider, organizations, and customers, consistent with one or more embodiments. The organizations 520 and 530 provide respective products and/or services for various third-party customers 540, 542, 544, 546, 548, 550, 552, and 554. The service provider 510 includes a number of host servers 514, 516, and 518 configured to provide respective services for organizations 520 and 530. In this example, the host servers 514, 516, and 518 are configured to provide a respective IPBX 522 and 532 for each organization 520 and 530. The IPBXs 522 and 532 are configured to route calls for a plurality of end-users 524, 526, 528, 534, 536, and 538 connected to the IPBX. For instance, IPBXs 522 and 532 route calls from between the end-users 524, 526, 528, 534, 536, and 538 and the third-party customers 540, 542, 544, 546, 548, 550, 552, and 554 of the organizations 520 and 530.

In addition to providing IPBXs 522 and 532, the service provider 510 may provide one or more additional products or services to the organizations 520 and 530. For example, in some implementations, host servers 514, 516, and 518 may be configured to provide various services for the organizations 520 and 530 including, for example, file servers, email servers, SMS servers, IM servers, web hosting, virtual meeting services (e.g., Voice-over-IP), billing, and/or remote computing services (e.g., virtual desktops, virtual private servers, and/or virtual enterprise services). For additional details regarding systems and method for providing computing services for a plurality of organizations, reference may be made to U.S. application Ser. No. 14/546,026, entitled "VIRTUAL DATA CENTERS", which is fully incorporated by reference herein.

The service provider 510 also includes a call data processing circuit 512 configured to monitor the IPBXs 522 and 532 provided by the host servers 514, 516, and 518 for the organizations 520 and 530. As described with reference to the call data processing circuit 110 in FIG. 1, the call data processing circuit 512 is configured to generate call summary metrics in response to the call event messages generated by the IPBXs. The call data processing circuit 512 is further configured to identify unreturned calls from the call summary metrics and determine respective priorities for the identified calls. The call data processing circuit 512 may perform various tasks on behalf of the operator based on identified unreturned calls and/or priority. For example, the call data processing circuit 512 may provide alerts to particular end-users in response to unreturned calls satisfying a set of alert criteria defined by the operator. As another example, the call data processing circuit 512 may analyze the unreturned calls to assess incoming call traffic demands, identify need for additional resources for processing calls, or assess call agent performance, for example.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in FIG. 1 through FIG. 5. Similarly, it will be apparent that a server (e.g., providing a corresponding software platform), includes a computer processing circuit that is configured to provide services to other circuit-based devices. Moreover, a VoIP-enabled circuit device includes processing circuits that are configured to establish VoIP communication sessions with other devices (e.g., personal computers, IP-enabled mobile phones, and tablet computers). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a Central Processing Unit (CPU) hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. An apparatus comprising:
a communications server;
a first processing circuit communicatively coupled to the communications server, the communications server being configured and arranged to route communications for a plurality of end-users having respective communication devices, wherein the respective communication devices each including communications circuitry being communicatively coupled to the communications server via a circuit-based communications network, the first processing circuit being configured and arranged to process data by: receiving messages that characterize device communications involving specific ones of the respective communication devices for which the communications server routed communications, and generating, from the messages, summary data for the device communications routed and involving the specific ones of the respective communication devices; and a second processing circuit communicatively coupled to the first processing circuit and configured and arranged to process the summary data by: retrieving, using a secondary data source, data relating to the routed communications and an indication of relative importance associated with the routed communications, and comparing the data as retrieved from the secondary data source and the indication of relative importance associated with the routed communications and, in response, generating data indicative of actions to be performed based in part on the indication of relative importance associated with the routed communications.

2. The apparatus of claim 1, wherein the first processing circuit and the second processing circuit are arranged as part of the same circuit.

3. The apparatus of claim 1, wherein the second processing circuit is further configured to generate and forward alerts to end-users based upon the indication of relative importance of the routed communications.

4. The apparatus of claim 1, wherein at least one of the first and second processing circuits is configured to identify, from the summary data, a set of incoming communications to the communications server that were unreturned by either voice or non-voice communications.

5. The apparatus of claim 4, wherein the second processing circuit is further configured to identify the set of incoming communications by identifying missed incoming communications that are not returned within a threshold period of time.

6. The apparatus of claim 5, wherein the second processing circuit is further configured to generate metadata identifying at least one communication as a potential sales lead.

7. The apparatus of claim 1, wherein at least one of the first processing circuit and the second processing circuit is further configured to determine the relative importance of a routed communication by determining a probability that the particular routed communication is SPAM.

8. The apparatus of claim 7, wherein the second processing circuit is further configured to determine the relative importance for a routed communication by:
storing, in response to the determined probability being greater than a threshold probability, data indicating the particular routed communication is of lower relative importance.

9. The apparatus of claim 8, wherein the second processing circuit is further configured to determine the relative importance for a routed communication by:
storing, in response to the determined probability being less than a threshold probability, data indicating the particular routed communication is of lower relative importance.

10. The apparatus of claim 1, wherein the second processing circuit is further configured to determine the relative importance for a routed communication by:
identifying end-users included in a specific grouping;
identifying a subset of the routed communications having one of the identified end-users as a recipient; and
storing data indicating the routed communications in the subset have a relative importance than calls not in the subset.

11. The apparatus of claim 1, wherein the second processing circuit is further configured to determine relative importance of a routed communication based on information indicative of a sender of the routed communication.

12. The apparatus of claim 1, wherein the second processing circuit is further configured to determine relative importance of a routed communication based on data contained in a contact directory of a recipient of the routed communication.

13. The apparatus of claim 1, wherein the second processing circuit is further configured to determine the respective priority of a particular call as a function of scheduling data of an end-user being called by the particular call.

14. A processor-readable tangible non-transient medium storing a computer program
for operating an arrangement of processing circuitry including a communications server communicatively coupled to at least one processing circuit, the computer program comprising:
instructions configured to route communications for a plurality of end-users having respective communication devices, each including communications circuitry, by way of the communications server;
instructions configured to receive messages that characterize device communications involving specific ones of the respective communication devices for which the communications server routed communications;
instructions configured to generate, from the messages, summary data for the device communications routed and involving the specific ones of the respective communication devices;
instructions configured to process the summary data by retrieving data relating to the routed communications using a secondary data source;
instructions configured to determine an indication of relative importance associated with the routed communications;
instructions configured to compare the data as retrieved from the secondary data source and the indication of relative importance associated with the routed communications; and instructions configured to generate data indicative of actions to be performed based in part on the indication of relative importance associated with the routed communications.

15. The processor-readable tangible non-transient medium of claim 14, wherein computer program further comprises instructions configured to generate and forwarding alerts to end-users based upon the indication of relative importance of the routed communications.

16. The processor-readable tangible non-transient medium of claim 14, wherein computer program further comprises instructions configured to identify, from the summary data, a set of incoming communications to the communications server that were unreturned by either voice or non-voice communications.

17. The processor-readable tangible non-transient medium of claim 16, wherein computer program further comprises instructions configured to identify the set of incoming communications by identifying missed incoming communications that are not returned within a threshold period of time.

18. The processor-readable tangible non-transient medium of claim 14, wherein computer program further comprises instructions configured to determine the relative importance of a routed communication by determining a probability that the particular routed communication is SPAM.

19. The processor-readable tangible non-transient medium of claim 14, wherein computer program further comprises instructions configured to determine the relative importance for a routed communication by:
   identifying end-users included in a specific grouping;
   identifying a subset of the routed communications having one of the identified end-users as a recipient; and
   storing data indicating the routed communications in the subset have a relative importance than calls not in the subset.

* * * * *